(12) United States Patent
Khader et al.

(10) Patent No.: US 8,972,468 B2
(45) Date of Patent: *Mar. 3, 2015

(54) METHOD FOR DISTRIBUTING A CERTIFIED APPLICATION EMPLOYING A PRE-CERTIFIED MASTER APPLICATION TEMPLATE

(71) Applicant: Ensequence, Inc., Portland, OR (US)

(72) Inventors: Aslam Khader, Beaverton, OR (US); Jeffery Todd Harper, Tualatin, OR (US); Halstead Winship York, Portland, OR (US)

(73) Assignee: Ensequence, Inc., Portland, OR (US)

( * ) Notice: Subject to any disclaimer, the term of this patent is extended or adjusted under 35 U.S.C. 154(b) by 172 days.

This patent is subject to a terminal disclaimer.

(21) Appl. No.: 13/647,176

(22) Filed: Oct. 8, 2012

(65) Prior Publication Data

US 2013/0031528 A1 Jan. 31, 2013

Related U.S. Application Data

(63) Continuation of application No. 12/767,705, filed on Apr. 26, 2010, now Pat. No. 8,307,020, which is a continuation-in-part of application No. 12/509,363, filed on Jul. 24, 2009, now Pat. No. 8,671,124.

(51) Int. Cl.
*G06F 17/30* (2006.01)
*G06F 9/445* (2006.01)
*G06F 9/44* (2006.01)

(52) U.S. Cl.
CPC ... *G06F 8/60* (2013.01); *G06F 8/10* (2013.01)
USPC ............ 707/899; 725/61; 725/110; 725/112; 725/42; 370/494; 370/495; 713/176; 713/189; 726/23

(58) Field of Classification Search
USPC .............. 707/899; 725/61, 110, 112, 42; 370/494, 495; 713/176, 189
See application file for complete search history.

(56) References Cited

U.S. PATENT DOCUMENTS

| 5,295,256 A | 3/1994 | Bapat |
| 5,297,279 A | 3/1994 | Bannon et al. |
| 5,335,320 A | 8/1994 | Iwata et al. |

(Continued)

FOREIGN PATENT DOCUMENTS

| GB | 2375631 B | 12/2004 |
| WO | 02/071212 A1 | 9/2002 |

OTHER PUBLICATIONS

Aho, Sethi and Ullman, "Compilers: Principles, Techniques, and Tools," 1986, Addison-Wesley, ISBN 0-201-10088-6, Chapter 6.

(Continued)

*Primary Examiner* — Yicun Wu
(74) *Attorney, Agent, or Firm* — Kristine Elizabeth Matthews

(57) ABSTRACT

A computer system is used to distribute an application using a data resource. An application using a data resource is created using an authoring environment. The application is converted into a certified master application template. The certified master application template is used to create a certified application and certified data resource. The certified application and certified data resource are distributed. During the distribution of the application, the certified master application template is modified and a new certified data resource is created. The new certified data resource is distributed.

12 Claims, 5 Drawing Sheets

(56) References Cited

U.S. PATENT DOCUMENTS

| | | | |
|---|---|---|---|
| 5,404,488 A | 4/1995 | Kerrigan et al. | |
| 5,625,693 A | 4/1997 | Rohatgi et al. | |
| 5,675,752 A | 10/1997 | Scott et al. | |
| 5,729,748 A | 3/1998 | Robbins et al. | |
| 5,754,858 A | 5/1998 | Broman et al. | |
| 5,898,872 A | 4/1999 | Richley | |
| 5,943,497 A | 8/1999 | Bohrer et al. | |
| 5,978,579 A | 11/1999 | Buxton et al. | |
| 6,026,237 A | 2/2000 | Berry et al. | |
| 6,072,953 A | 6/2000 | Cohen et al. | |
| 6,182,279 B1 | 1/2001 | Buxton | |
| 6,237,136 B1 | 5/2001 | Sadahiro | |
| 6,269,473 B1 | 7/2001 | Freed et al. | |
| 6,427,228 B1 | 7/2002 | Wigger | |
| 6,590,589 B1 | 7/2003 | Slulman et al. | |
| 6,671,804 B1 | 12/2003 | Kent | |
| 6,732,331 B1 | 5/2004 | Alexander | |
| 6,775,680 B2 | 8/2004 | Ehrman et al. | |
| 6,868,427 B2 | 3/2005 | Herzog et al. | |
| 6,931,623 B2 | 8/2005 | Vermeire et al. | |
| 6,966,002 B1 | 11/2005 | Torrubia-Saez | |
| 6,996,566 B1 | 2/2006 | George et al. | |
| 6,996,843 B1 | 2/2006 | Moran | |
| 7,000,185 B1 | 2/2006 | Murren et al. | |
| 7,047,318 B1 | 5/2006 | Svedloff | |
| 7,096,463 B2 | 8/2006 | Pisupati et al. | |
| 7,117,370 B2 | 10/2006 | Khan et al. | |
| 7,155,705 B1 | 12/2006 | Hershberg et al. | |
| 7,165,076 B2 | 1/2007 | Bentley | |
| 7,181,694 B2 | 2/2007 | Reiss et al. | |
| 7,219,332 B2 | 5/2007 | Gouge et al. | |
| 7,228,537 B2 | 6/2007 | Murray | |
| 7,237,227 B2 | 6/2007 | Lei et al. | |
| 7,287,229 B2 | 10/2007 | Forkner et al. | |
| 7,360,097 B2 | 4/2008 | Rothstein | |
| 7,412,687 B2 | 8/2008 | Goodwin et al. | |
| 7,496,757 B2 | 2/2009 | Abbott et al. | |
| 7,548,946 B1 | 6/2009 | Saulpaugh et al. | |
| 7,631,004 B2 | 12/2009 | Skibo et al. | |
| 7,644,262 B1 | 1/2010 | Bromley et al. | |
| 7,694,117 B2 | 4/2010 | Kilian et al. | |
| 7,747,942 B2 | 6/2010 | Dasari et al. | |
| 7,779,389 B2 | 8/2010 | Markov et al. | |
| 7,793,087 B2 | 9/2010 | Zenz et al. | |
| 8,229,984 B2 | 7/2012 | Khader et al. | |
| 8,307,020 B2 | 11/2012 | Khader et al. | |
| 8,549,308 B2 | 10/2013 | Landrock et al. | |
| 8,806,193 B2 * | 8/2014 | Swaminathan et al. | 713/155 |
| 2002/0057286 A1 | 5/2002 | Markel et al. | |
| 2002/0059278 A1 | 5/2002 | Bailey et al. | |
| 2002/0104069 A1 | 8/2002 | Gouge et al. | |
| 2002/0199187 A1 | 12/2002 | Gissin et al. | |
| 2003/0097657 A1 | 5/2003 | Zhou et al. | |
| 2003/0101451 A1 | 5/2003 | Bentolila et al. | |
| 2003/0158760 A1 | 8/2003 | Kannenberg | |
| 2004/0216086 A1 | 10/2004 | Bau | |
| 2005/0028156 A1 | 2/2005 | Hammond et al. | |
| 2005/0081061 A1 | 4/2005 | Acott et al. | |
| 2005/0138558 A1 | 6/2005 | Duevel et al. | |
| 2005/0268280 A1 | 12/2005 | Fildebrandt | |
| 2006/0053390 A1 | 3/2006 | Gariepy-Viles | |
| 2006/0080329 A1 | 4/2006 | Skibo et al. | |
| 2006/0143148 A1 | 6/2006 | Degtyar et al. | |
| 2007/0038781 A1 | 2/2007 | Joung et al. | |
| 2007/0061731 A1 | 3/2007 | Dillon et al. | |
| 2007/0107016 A1 | 5/2007 | Angel et al. | |
| 2007/0220583 A1 | 9/2007 | Bailey et al. | |
| 2008/0059282 A1 | 3/2008 | Vallier et al. | |
| 2008/0115104 A1 | 5/2008 | Quinn | |
| 2008/0147675 A1 | 6/2008 | Engehausen et al. | |
| 2009/0049430 A1 | 2/2009 | Pai et al. | |
| 2009/0089746 A1 | 4/2009 | Rigolet | |
| 2009/0094632 A1 | 4/2009 | Newnam et al. | |
| 2009/0187939 A1 | 7/2009 | Lajoie | |
| 2009/0216619 A1 | 8/2009 | Tavernier | |
| 2009/0299857 A1 | 12/2009 | Brubaker | |

OTHER PUBLICATIONS

Ardito, Costabile and Lanzilotti, "Enhancing User Experience while Gaming in Archaeological Parks with Cellular Phones," Proceedings of the 8th International Conference on Interaction Design and Children, Jun. 2009, Como, Italy, ACM, New York, NY, pp. 270-271.

Third Party Peer Review of Ardito et al., "Enhancing User Experience while Gaming in Archaeological Parks with Cellular Phones," submitted for U.S. Appl. No. 12/776,326, 2 pages, May 6, 2011.

Third Party Peer Review of 20070220583, submitted for U.S. Appl. No. 12/873,198, 2 pages, Feb. 16, 2011.

Third Party Peer Review of 7644262, submitted for U.S. Appl. No. 12/873,198, 2 pages, May 2, 2011.

Third Party Peer Review of 20030097657 (U.S. Appl. No. 09/953,327), submitted for U.S. Appl. No. 12/873,198, 2 pages, May 2, 2011.

Third Party Peer Review of 5729748, submitted for U.S. Appl. No. 12/873,198, 2 pages, Apr. 22, 2011.

Third Party Peer Review of 7694117, submitted for U.S. Appl. No. 12/873,198, 2 pages, Apr. 22, 2011.

Third Party Peer Review of 7779389, submitted for U.S. Appl. No. 12/873,198, 1 page, Apr. 22, 2011.

Third Party Peer Review of 7793087, submitted for U.S. Appl. No. 12/873,198, 1 page, Apr. 22, 2011.

Third Party Peer Review of 20090187939, submitted for U.S. Appl. No. 12/873,198, 2 pages, Feb. 16, 2011.

Third Party Peer Review of 20080059282, submitted for U.S. Appl. No. 12/873,198, 2 pages, Apr. 22, 2011.

"What's New in NetBeans IDE 4.0," Published online at <www.netbeans.org/community/releases/40/whats-new-40.html>, archived on Dec. 14, 2004 at <http://web.archive.org/web/20041214145621/http://www.netbeans.org/community/releases/40/whats-new-40.html> (6 pages), Dec. 14, 2004.

Third Party Peer Review of "What's New in NetBeans IDE 4.0," submitted for U.S. Appl. No. 12/509,397, 2 pages, Sep. 2, 2011.

Third Party Peer Review of 20080115104, submitted for U.S. Appl. No. 12/509,383, 2 pages, Sep. 2, 2011.

USPTO Office Action—U.S. Appl. No. 12/509,363—Notification Date Mar. 1, 2013.

USPTO Office Action—U.S. Appl. No. 12/509,397—Notification Date Sep. 3, 2013.

USPTO Office Action—U.S. Appl. No. 12/509,363—Notification Date Jul. 19, 2013.

USPTO Office Action—U.S. Appl. No. 12/873,178—Notification Date Sep. 23, 2013.

USPTO Office Action—U.S. Appl. No. 12/873,178—Notification Date Apr. 17, 2013.

USPTO Office Action—U.S. Appl. No. 12/509,383—Notification Date Jul. 8, 2013.

USPTO Office Action—U.S. Appl. No. 12/509,383—Notification Date Apr. 26, 2012.

USPTO Office Action—U.S. Appl. No. 12/509,383—Notification Date Nov. 8, 2012.

USPTO Office Action—U.S. Appl. No. 12/509,397—Notification Date Sep. 28, 2011.

USPTO Office Action—U.S. Appl. No. 12/509,397—Notification Date May 14, 2013.

USPTO Office Action—U.S. Appl. No. 12/509,397—Notification Date Apr. 30, 2012.

USPTO Office Action—U.S. Appl. No. 12/509,397—Notification Date Dec. 7, 2012.

USPTO Office Action—U.S. Appl. No. 12/873,178—Notification Date Sep. 27, 2011.

USPTO Office Action—U.S. Appl. No. 12/873,178—Notification Date Mar. 26, 2012.

USPTO Office Action—U.S. Appl. No. 12/776,326—Notification Date Sep. 21, 2011.

USPTO Office Action—U.S. Appl. No. 12/873,198—Notification Date Jul. 5, 2013.

(56) References Cited

OTHER PUBLICATIONS

USPTO Office Action—U.S. Appl. No. 12/873,198—Notification Date Sep. 16, 2011.
USPTO Office Action—U.S. Appl. No. 12/873,198—Notification Date Mar. 30, 2012.
USPTO Office Action—U.S. Appl. No. 12/509,397—Notification Date Nov. 27, 2013.
USPTO Office Action—U.S. Appl. No. 12/509,397—Notification Date Jun. 2, 2014.
USPTO Office Action—U.S. Appl. No. 12/873,178—Notification Date Apr. 9, 2014.
USPTO Office Action—U.S. Appl. No. 12/767,705—Notification Date Mar. 27, 2012.
USPTO Office Action—U.S. Appl. No. 12/767,705—Notification Date Oct. 12, 2011.
USPTO Advisory Action—U.S. Appl. No. 12/509,363—Notification Date Apr. 26, 2012.
USPTO Office Action—U.S. Appl. No. 12/509,363—Notification Date Jan. 10, 2012.
USPTO Office Action—U.S. Appl. No. 12/509,363—Notification Date Aug. 17, 2011.

* cited by examiner

TEMPLATE METADATA

```
301    <?xml version="1.0" encoding="utf-8"?>
302    <template>
303      <modify-property file="page1.tvb" object="text1" property="label" type="string">
304        <constraint text-max-length="28"/>
305      </modify-property>
306      <modify-variable file="page1.tvb" variable="myVar" type="integer">
307        <constraint range-min="0" range-max="10"/>
308      </modify-variable>
309      <modify-property file="page1.tvb" object="text1" property="hAlign" type="string">
310        <constraint valid-value="left"/>
311        <constraint valid-value="middle"/>
312        <constraint valid-value="right"/>
313      </modify-property>
314      <modify-resource file="myApp.tvr" resource="imageRes1">
315        <constraint valid-extension=".png"/>
316        <constraint valid-extension=".bmp"/>
317      </modify-resource>
318      <modify-cell file="data1.tvd" table="tbl1" row="2" col="3" type="integer">
319        <constraint range-min="0"/>
320      </modify-cell>
321    </template>
```

FIG. 3

METHOD FOR DISTRIBUTING A CERTIFIED APPLICATION EMPLOYING A PRE-CERTIFIED MASTER APPLICATION TEMPLATE

CROSS-REFERENCE TO RELATED APPLICATIONS

This application is a continuation of U.S. patent application Ser. No. 12/767,705, filed Apr. 26, 2010, now U.S. Pat. No. 8,307,020, issued Nov. 6, 2012 which is a continuation-in-part of U.S. patent application Ser. No. 12/509,363, filed Jul. 24, 2009, entitled "METHOD FOR APPLICATION AUTHORING EMPLOYING A PRE-CERTIFIED MASTER APPLICATION TEMPLATE", which are incorporated herein by reference.

FIELD OF THE INVENTION

This invention relates generally to generation of digital information attesting to the legitimacy of a transmission, and more specifically to the certification of applications intended for broadcast to and execution upon digital receiver devices.

BACKGROUND OF THE INVENTION

The digital revolution has come to television. With the advent of digitally-encoded television, simple analog television (TV) receivers have been superseded by digital receivers capable of receiving and demodulating electrical signals, then extracting and decoding the compressed video and audio data streams mandated by the Motion Picture Experts Group (MPEG) encoding standards that form the basis for the Advanced Television Systems Committee digital television broadcast standard in the United States. These integrated receiver/decoder (IRD) devices contain analog and digital processing circuitry that is controlled by a central processing unit (CPU). IRDs also contain static and dynamic memory stores, interfaces, and a full complement of features that serve to enable a broad range of computational processing, including the execution of resident or downloaded applications software. When executing such applications, the IRD can generate graphics content that is overlaid onto the video content for display on an external television screen. Newer televisions incorporate the functions of the IRD, making them useful computation platforms capable of executing downloaded applications. More sophisticated IRDs may incorporate disc drive storage subsystems. These personal video recorders (PVRs) are capable of storing and playing back audio/video content.

A parallel body of work has aimed at developing standardized software execution environments that can enable the widespread deployment of interactive applications within the television broadcast infrastructure. This work has been complicated in the past by the wide variety of hardware and software deployed in IRDs, particularly set-top boxes (STBs) developed for the decoding and presentation of signals in cable TV distribution systems. The effort to develop a common Multimedia Home Platform (MHP) for consumer electronic devices led to the development of a Java-based standard for interactivity in the cable television realm, the Open Cable Application Platform (OCAP) now called tru2way. More recently, a separate standardization effort has produced the Enhanced Television Binary Interchange Format (ETV-BIF) standard for less-capable cable platforms.

Because of limitations in memory size and processor power, the operating systems deployed in many IRDs afford few of the security features that are common in more powerful networked computer systems. Therefore, the potential exists for any application that executes on an IRD to negatively impact the operation of the IRD, for example by overwriting system memory or modifying hardware registers. Accordingly, security efforts in the television broadcast environment have focused on validating the security of individual applications that are supplied to IRDs. Network operators commonly require certification of every application that is broadcast on their network, to minimize the chances that an application will cause an IRD on the network to malfunction, which might necessitate a costly technical service call to remedy the problem.

Because of the magnitude of these security concerns, the application certification process is often lengthy and costly to undertake. The process is significantly complicated by the range of hardware and software employed in the various IRDs that might be deployed in a single network, which requires substantial expertise during the execution and testing process. The certification hurdle raises the cost for preparing an application for broadcast, and limits the number of applications that receive certification and enter the broadcast stream.

The certification hurdle is a direct impediment to widespread use of interactivity in television broadcasting, particularly for interactive advertising. For interactive advertising to make economic sense in broad deployment, the money and time investments in getting an application to air must be as small as possible. Interactivity cannot be limited to those few high-profile, high-budget advertisements prepared for showcase events like the Super Bowl or the Olympics, but must be made affordable in the context of 30-second advertisements played with more typical programming content.

In many interactive television applications, the data content employed by the application may be created or modified during the execution of an application. For example, data displaying the current medal counts to be displayed by an interactive application broadcast with the Olympics will obviously change from hour to hour and day to day during the multi-day broadcast duration of the Olympics. Preferentially, modification of such data should not require the recertification of the application.

What is required is an application development paradigm that enables a process for creating and distributing interactive television applications that can receive certification for broadcast with minimal time and cost, while maintaining application and data security in conformance with certification requirements when updating application resources during broadcast and execution.

SUMMARY OF THE INVENTION

The inventive method provides a method for deploying a certified application by authoring an application using at least one data resource; converting the application into a master application template containing at least one data resource template; certifying the master application template; making a copy of the master application template; modifying the copy of the master application template; generating a certified executable application with the at least one data resource from the modified copy of the application template; distributing the certified executable application with the at least one data resource; and during the distribution of the certified executable application further modifying at least one data element of the modified copy of the application template; generating a modified certified data resource from the further modified copy of the application template; and distributing the certified application and the modified certified data resource.

The present invention further provides a method for deploying a certified application by authoring an application using at least one data resource; converting the application into a master application template containing at least one data resource template by creating at least one metadata item associated with a data element of the at least one data resource template that specifies at least one attribute of the data element suitable for modification and specifies at least one requirement for the modification of the attribute; certifying the master application template by determining that modifying the attribute in accordance with the requirement for the modification of the attribute does not violate a requirement for certification; making a copy of the master application template; generating a certified executable application from the copy of the master application template; modifying the copy of the master application template by modifying the attribute according to constraints specified in the requirement; generating a certified data resource from the modified copy of the master application template; and distributing the certified executable application and the certified data resource.

In a further embodiment of the inventive method, converting an application into a master application template containing at least one data resource template is accomplished by creating a representation of the application and a representation of the data resource; selecting at least one attribute of a data element of the data resource representation that is suitable for modification; creating at least one metadata item that specifies the selected attribute and specifies at least one requirement for modification of the selected attribute; aggregating the metadata items; associating the aggregated metadata with the data resource representation; and storing the metadata with the application representation and the data resource representation.

In a still further embodiment of the inventive method, certifying a master application template containing at least one data resource template is accomplished by generating an executable application from the application representation and a data resource from the data resource representation; determining that the executable application meets all requirements for certification; determining that the data resource meets all requirements for certification; and determining that modifying each of the attributes specified in the metadata in accordance with all requirements for the modification of the attribute does not violate any requirement for certification.

In a still further embodiment of the inventive method, determining that modifying each of the attributes specified in the metadata in accordance with all requirements for the modification of the attribute does not violate a requirement for certification is performed by examination of the application representation, the data resource representation, and the metadata.

In a still further embodiment of the inventive method, a certified data resource is generated and distributed by modifying at least one attribute of a copy of a data resource template during the execution of the application; generating a certified data resource from the modified copy of the data resource template; and distributing the certified data resource.

In a still further embodiment of the inventive method, a data resource representation comprises at least one source file.

In a still further embodiment of the inventive method, a data resource representation comprises an in-memory representation of the data resource.

In a still further embodiment of the inventive method, a data resource representation comprises an object representation of the data resource stored in a database.

In a still further embodiment of the inventive method, an attribute to be modified is the data content of a cell in a data table.

In a still further embodiment of the inventive method, the data content is one of an integer, floating-point number, string, or image data stored in or associated with the cell in the data table.

In a still further embodiment of the inventive method, a requirement for a modification is that the modified value is one of a list of valid values.

In a still further embodiment of the inventive method, a requirement for a modification is that the modified value falls within a bounded or half-bounded range of values.

In a still further embodiment of the inventive method, a requirement for a modification is that the modified value matches a regular expression.

In a still further embodiment of the inventive method, creating a certified application is accomplished by determining that modifying all of the attributes in accordance with all of the requirements for modification of an attribute does not violate any requirement for certification.

BRIEF DESCRIPTION OF THE DRAWINGS

The preferred and alternative embodiments of the present invention are described in detail below with reference to the following drawings.

FIG. 3 depicts an example of template metadata.

DETAILED DESCRIPTION OF THE INVENTION

Figure 1:
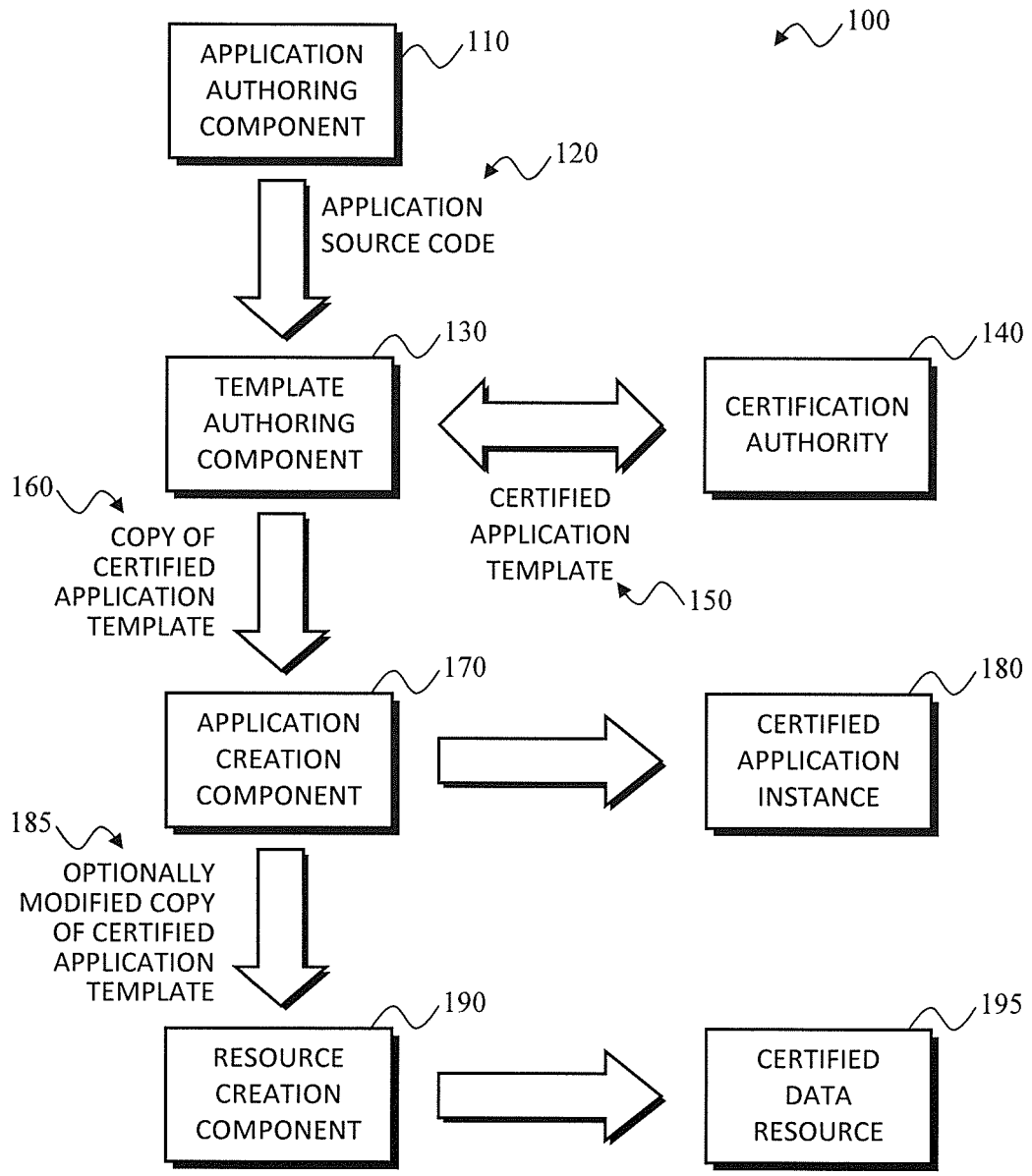
FIG. 1 depicts components of an exemplary system that implements an aspect of the inventive method.

By way of overview, embodiments of the present invention provide a method for authoring a certified application and generating a certified data resource for the application.

As used herein, the term "application" is intended to refer generally to an experience of appearance and behavior engendered by a computing platform. An application is commonly authored in a source code language using an authoring environment, the source code being used to generate an executable version of the application for deployment to a computing platform to realize the desired experience.

As used herein, the term "executable application" is intended to refer to a body of digital information comprising executable instructions and data that when processed on a suitable computing platform yields appearance and behavior as intended by the creator of the application. An executable application may be encoded using native CPU instructions, interpreted byte codes, declarative data structures, or any combination of such encodings. An executable application may respond to external events by appropriate modification of appearance and behavior, as specified by the code and data comprising the executable application.

As used herein, the term "resource" is intended to refer to a body of binary data, exclusive of the source code or executable instructions of an application, which is used during the execution of the application to control the appearance or behavior of the application.

As used herein, the term "data resource" is intended to refer to a collection of one or more resources aggregated into a body of data distinct from the body of digital information comprising the executable instructions of an application. The contents of a data resource may take the form of tabular, numerical, string, image, font, and/or other content usable by the executed or interpreted code of the application.

As used herein, the term "application instance" is intended to refer to an executable application and any associated data resources.

As used herein, the term "application representation" is intended to refer to a body of digital information that defines an application. The application representation may be one or more source code files, an in-memory representation of the application structure and function, or a database representation of the application structure and function. An application representation may be used to generate an executable version of the application.

As used herein, the term "data resource representation" is intended to refer to a body of digital information that defines a data resource. The data resource representation may be one or more source code files, an in-memory representation of the resource structure and content, or a database representation of the resource structure and content. A data resource representation may be used to generate a distributable version of the data resource.

As used herein, the term "metadata" is intended to refer to human-readable or binary content which is not part of an application or data resource representation, but which refers to attributes of the application or data resource representation, or to modifications that may be made to such attributes.

As used herein, the term "template" is intended to refer to an application representation and zero or more data resource representations and associated metadata. The associated metadata define allowable modifications to the application and data resource representations. The application and data resource representations for a template can be modified in accordance with metadata associated with the application and representations. A modified application representation may be used to generate an executable application. A modified data resource representation may be used to generate a data resource. The phrases "application template" and "master application template" as used herein are synonymous with the term "template".

As used herein, the terms "certify" and "certification" are intended to refer to the process of validating the appearance and/or behavior of an executable application and associated data resource(s) against a specified set of requirements, to determine that the application and data resource(s) meets each and all of the specified requirements.

As used herein, the phrase "generate an application" is intended to refer to the process of converting an application representation into an executable application.

As used herein, the phrase "generate a data resource" is intended to refer to the process of converting a data resource representation into a data resource.

As used herein, the terms "distribute", "distributing", "distribution" and derivatives thereof are intended to refer to the process of conveyance, promulgation, or broadcast of an application and any associated resources to one or more devices capable of receiving and decoding the application and resources and of executing the application. The application and any associated resources may be distributed in tangible or intangible form. An intangible form of an application and any associated resources may be distributed by wired or wireless means, or a combination of such means. An application and its associated resources may be distributed in the same form or in different forms, and may be distributed by the same means or by different means.

The various aspects of the claimed subject matter are now described with reference to the annexed drawings. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. Additionally it should be appreciated that a carrier wave can be employed to carry computer-readable electronic data such as those used in transmitting and receiving electronic mail or in accessing a network such as the Internet or a local area network. Of course, those skilled in the art will recognize many modifications may be made to this configuration without departing from the scope or spirit of the claimed subject matter.

FIG. 1 depicts the components of an exemplary system 100 on which the inventive method may be practiced. An application can be authored using an application authoring component 110. An example of a suitable application authoring component 110 is the Create™ ETV-BIF product developed by Ensequence, Inc. of Portland, Oreg. A further example of an application authoring component 110 is the TVWorks™ XML Development Kit developed by TVWorks, LLC, of Mill Valley, Calif. In this exemplary system, the application representation is in the form of source code.

Once application source code 120 has been written, the application source code is converted into a master application template and master application template metadata are authored using a template authoring component 130. Template authoring component 130 serves to create and modify metadata associated with the master application template. Template authoring component 130 may be any suitable text editor executing on a computer workstation, or may be a specialized editing environment configured to create and edit template metadata, for example by means of an application executing on a computer workstation or through a web services interface specialized for this purpose.

Following the authoring of the master application template, the master application template is submitted to a certification authority 140 for certification testing. In an exemplary embodiment of the inventive method, the submission to the certification authority 140 comprises the master application template content and an application and data resource(s) generated from the master application template, for example by use of the default values of any modifiable attributes of the template. Examples of how the master application template content may be submitted to the certification authoring 140 include: (a) in the form of human-readable source code files and metadata files, (b) through a specialized application that visualizes an in-memory representation of the application representation, data resource representation(s) and associated metadata, (c) through access to a database storing the application representation, data resource representations(s) and associated metadata, or (d) by some other means that allows examination of the application representation and the allowable modifications of the representation. Certification authority 140 may certify the application, or may report problems with the certification testing. In the latter case, further modification of a master application template is performed using template authoring component 130.

Once certification authority 140 certifies a master application template as a certified master application template 150, the certified master application template can be used to create certified applications. When creating a certified application, a copy 160 of a certified master application template is created, and an application creation component 170 is used to generate an executable version of the certified application instance 180 which includes a certified data resource. Prior to application generation, application creation component may optionally be used to modify the source files of the copy of the certified master application template within the constraints embodied in the master application template metadata. Application creation component 170 may be any suitable text editor executing on a computer workstation, or may be a specialized editing environment configured to allow modification of the application template application and data resource representations in accordance with the requirements for modification embodied in the metadata of the certified application template, for example by means of an application executing on a computer workstation or through a web services interface specialized for this purpose.

The copy of the certified master template 185, which may optionally have been modified prior to application generation, is then conveyed to resource creation component 190. Resource creation component 190 may be any suitable text editor executing on a computer workstation, or may be a specialized editing environment configured to allow modification of the application template data resource representation in accordance with the requirements for modification embodied in the metadata of the certified application template, for example by means of an application executing on a computer workstation or through a web services interface specialized for this purpose.

Once all modifications have been performed, resource creation component 190 is used to generate a certified modified data resource 195.

To further clarify, allowable modifications of the application template application and data resource representations do not constitute, incorporate or permit lexical, syntactic or semantic modifications that would violate source code requirements of the application creation component, for example the requirements of a C, C++, or C# language compiler. Rather, in the inventive method allowable modifications and requirements thereof are limited to those which would maintain lexical, syntactic and semantic correctness with respect to the source code requirements of the application creation component, but which nonetheless modify the appearance and/or behavior of the resulting application.

By way of further explanation of the process illustrated in FIG. 1, the following discussion will consider a non-limiting example of an application using the novel features of the inventive method. An application is designed to be broadcast during the Olympic Games, and an aspect of the functionality of the application is to display the daily and cumulative medal counts by country and by event. Information about the daily and cumulative medal counts will be contained within one or more data resource. A further aspect of the application is to display information about athletes participating in the Games. A still further aspect of the application is to display contents of news items relevant to the athletes and the Games. The Olympic Games extend over a period of many days. Accordingly, the application and associated data resources are broadcast and available for execution during the entire period of the Games. Recertification of the application as medal counts change or as news items are updated or replaced is clearly an impractical endeavor, so a method is required that ensures that the application and associated data resources will continue to meet all requirements for certification even as the content of the data resources changes during the period of application broadcast. During the design of the application, requirements are placed on all modifications of the content of the data resources, including for example the number of sports and the number of medals for each sport. An example of a requirement for a modification is that the number of medals for a given sport must be a non-negative number less than or equal to 30. All such requirements are incorporated into the master application template, and are submitted during the certification process for the master application template. Once the master application template is certified, a copy of the master application template is made and a broadcast instance of the application and associated data resources are generated. Thereafter, during the course of the Olympic Games when medal counts change, news items appear, or biographical information for athletes becomes available, the contents of the copy of the master application template are modified as required and data resources are regenerated to reflect the updated content. At each change, all modifications are checked to verify that the requirements for the modification have been met prior to the generation and broadcast of the updated data resource. These checks ensure that the certification of the broadcast application has not been compromised.

Figure 2:
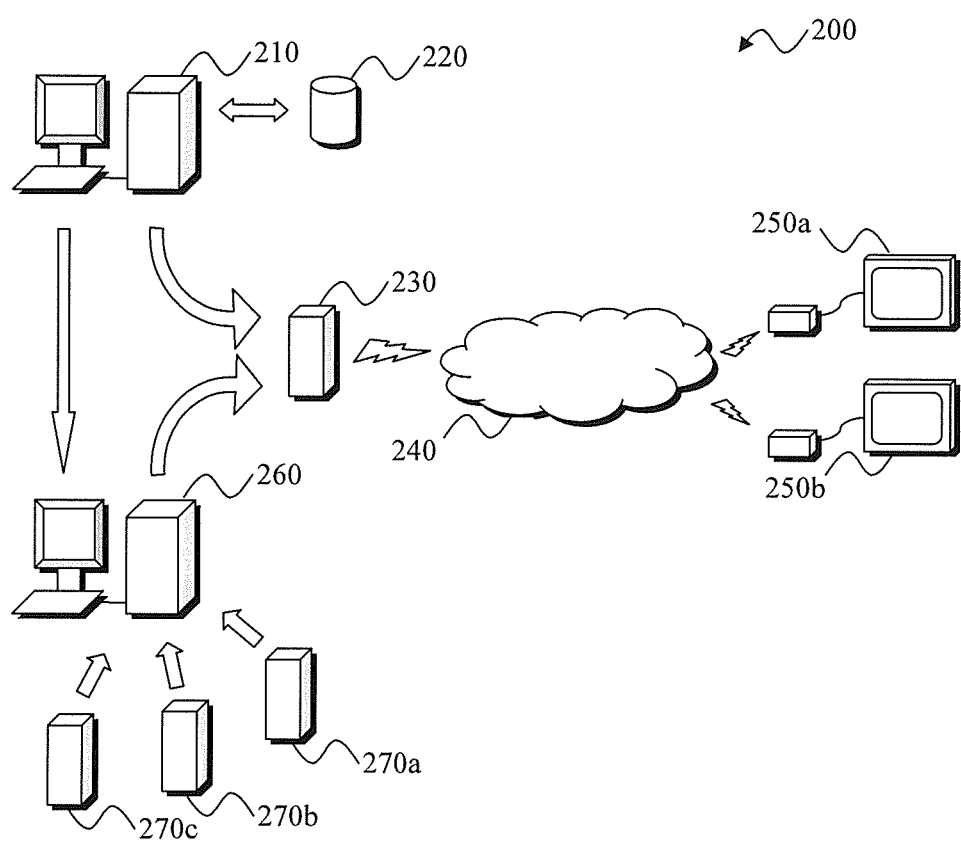
FIG. 2 depicts a system configured to implement an aspect of the inventive method.

FIG. 2 depicts an example of a system 200 configured for the practice of an aspect of the inventive method. Creation subsystem 210 performs the actions of application creation component 170. Creation subsystem 210 may be a workstation computer, an interface device providing access to an application server, or other means known in the art for providing the functionality of application creation. A user of computer subsystem 210 extracts a copy of a certified application template 160 from template repository 220. Template repository 220 may be a database, a file system, or other storage mechanism known in the art. Template repository 220 may be distinct from creation subsystem 210, or may be integral to it. Creation subsystem 210 creates a certified application instance 180 from the copy of the certified application template, and passes the application instance 180 to distribution subsystem 230. Distribution subsystem 230 may be a transport stream generator, an Internet Protocol server, a web server, or other unicast, multicast, or broadcast system known in the art. Distribution subsystem 230 may be distinct from creation subsystem 210, or may be integral to it. The certified application instance 180 is distributed via a distribution network 240 to receivers 250*a*, 250*b*. Distribution network 240 may be a wired cable distribution plant, a satellite uplink-downlink distribution system, a terrestrial ATSC or DVB-H broadcast transmission system, or other wired or wireless distribution system known in the art. Receivers 250*a*, 250*b* may receive, decode and execute the certified application instance 180. Creation subsystem 210 also conveys a copy of the certified application template 185 to resource generation subsystem 260. Resource generation subsystem 260 performs the actions of data resource component 190. Resource generation subsystem 260 may be a workstation computer, an interface device providing access to an application server, or other means known in the art for providing the functionality of resource creation. Resource generation subsystem 260 may be distinct from creation subsystem 210, or may be integral to it. During the distribution and execution of certified application instance 185, resource generation subsystem 260 receives input from data resources 270a, 270b, 270c. Resource generation subsystem 260 uses the input when modifying the data resource representation in the copy of the certified application template 185, then generates an updated copy of the certified data resource 195. In the Olympic Games example described above, resource generation subsystem 260 may receive updated medal information from data resource 270a, athlete biographies from data resource 270b, and news stories from data resource 270c. Data resources 270a, 270b, 270c may be database servers, email servers, RSS servers, twitter feeds, manual input terminals, or other means known in the art for creating and distributing data. Data may be transmitted from data resources 270a, 270b, 270c to resource generator subsystem 260 in the form of RSS feeds, HTTP messages or responses, SMS messages, wireless tweets, text files, data files, or other suitable means. Data transmission may be wired or wireless, and data may be pushed by data resources 270a, 270b, 270c, or pulled by resource generator subsystem 260. Data may be updated one or more times, and one or more updated copies of certified data resource 195 may be generated. When an updated copy of certified data resource 195 is generated, resource generation subsystem 260 passes the copy to distribution subsystem 230, which distributes the updated copy of the certified data resource through a distribution network 240 to receivers 250a, 250b which receive the data resource, decode the contents, and utilize the updated data in the course of executing the application instance 180.

A master application template comprises an application representation, zero or more data resource representations, and associated metadata that define the characteristics of the template. The metadata may be incorporated into the application representation and the data resource representation(s), or may be stored in a form distinct from the application representation and data resource representation(s). By way of illustration, the following description describes a set of metadata tags utilized in an exemplary implementation of the inventive method, in which the application and data resource representations are source code written using the TVScript-BIF language as employed in the Create ETV-BIF application authoring product.

Briefly, TVScript-BIF is an object-oriented language for authoring declarative applications that execute on an ETV-BIF user agent. A TVScript-BIF application consists of: (a) an object hierarchy constructed from the various native objects defined by the TVScript-BIF language, (b) optional variables that contain static or dynamic values used during the execution of the application to control application appearance or behavior, (c) optional event function code that is executed in response to events, (d) optional data tables used to control application appearance or behavior, (e) optional resources used when executing the application, and (f) and optional signal and trigger data that may be sent to the application during execution. TVScript-BIF applications execute on compliant ETV-BIF user agents. The ETV-BIF binary format and the behavioral requirements for a compliant ETV-BIF user agent are defined by OpenCable specification OC-SP-ETV-BIF1.0-I04-070921 "Enhanced TV Binary Interchange Format 1.0" issued by Cable Television Laboratories Inc., Louisville, Colo., incorporated herein by reference.

The source code of a TVScript-BIF application comprises a series of human-readable files that: (a) define the hierarchy of object instances ("widgets") that make up the application, (b) declare the associated functions and variables used during the execution of the application, (c) specify the values of data tables incorporated into the application, (d) designate the source files for image and font resources used by the application, and (e) define the structure of the ETV-BIF resources to be created when generating the executable application. ETV-BIF resource types include page resource and data resource. A page resource contains object specifications and executable code, and may contain data. A data resource contains only resource data.

In an exemplary implementation of the inventive method, when a TVScript-BIF application is converted into a template, metadata are stored with the source code. The metadata contain the specifications for how the template application source code may be modified when creating a version of the application from the template. In this exemplary implementation, the metadata are encoded as an XML document.

FIG. 3 shows an example of the content of a metadata file defining the allowable modifications in a TVScript-BIF application. Note that the line numbers in FIG. 3 are not part of the source content of the metadata file but are included as reference markers for the following discussion. Furthermore, the formatting conventions illustrated in FIG. 3 are not a requirement of the inventive system, but are intended to clarify the structure and content of the example file.

In this illustrative example, line 301 signals that the contents of the file are compliant with the Extensible Markup Language specification, and that the content is encoded using the UTF-8 standard.

A 'template' tag at line 302 signals that this file contains a specification for the metadata of a master application template.

A 'modify-property' tag at line 303 denotes a property of an object instance, the initial value of which may be modified. A 'modify-property' tag has: an attribute 'file' that names the source file containing the code for the declaration of the object instance whose property can be modified; an attribute 'object' that identifies the object instance within the source file whose property can be modified; an attribute 'property' that identifies the property within the object instance that can be modified; and an attribute 'type' that signals the type of the content to be provided as the value for the property. Examples of allowable content types are 'integer', 'float', and 'string'. The 'modify-property' tag at line 303 names the 'label' property of the 'text1' object instance contained in source file 'page1.tvb'. If this property is modified during the application creation process, the new content will be substituted for the original value of the named property when the application representation is modified.

The content type determines the allowable textual content that can be specified for the substitution. Example content types 'integer', 'float', and 'string' allow for different constraint models to be applied depending on whether the substitute content for the source file comprises an integer value, a real number value, or a sequence of characters, respectively. For example, the allowable textual content for an 'integer' content type is limited to string values that express an integer value, such as "12", "−365", and "0x7F3E9".

The 'modify-property' tag at line 303 contains a 'constraint' child tag at line 304. A 'constraint' tag defines restrictions on the content of the modification that can be made to the entity named in the parent tag of the 'constraint' tag. The 'constraint' tag at line 304 restricts the maximum number of characters that can be contained in the string provided to substitute for the 'label' property of the 'text1' object instance.

A 'modify-variable' tag at line 306 denotes a variable whose initial value may be modified. A 'modify-variable' tag has attribute 'file' that names the source file containing the code for the declaration of the variable whose initial value can be modified; attribute 'variable' that names the variable that can be modified; and attribute 'type' that signals the type of the content to be supplied as the value for the variable. The 'modify-variable' tag at line 306 names the integer variable 'myVar' declared in source file 'page1.tvb', and specifies a replacement value of type integer.

The 'modify-variable' tag at line 306 contains a 'constraint' tag at line 307. The 'constraint' tag at line 307 contains attributes 'range-min' and 'range-max' that specify a range of valid integer values that can be substituted for the initial value of the 'myVar' variable, in this case the range from 0 to 10 inclusive.

A second 'modify-property' tag appears at line 309, naming the 'hAlign' property of the 'text1' object instance contained in source file 'page1.tvb'. This tag contains three child 'constraint' tags at lines 310, 311, and 312. These 'constraint' tags list valid string values that may be substituted for the initial value of the 'hAlign' property. If a modification tag contains multiple 'constraint' tags, by default the substitution value must satisfy at least one of the constraints.

Other tags (not shown) can be used to modify the logical implications of one or more constraints. For example, a 'not' constraint containment tag can contain a constraint that must not be satisfied for the 'not' constraint to be satisfied. Logical combinations of constraints can be achieved by the use of 'and' and 'or' constraint containment tags that carry the corresponding Boolean logic implications. An 'and' tag can contain one or more 'constraint', 'not', 'and' and 'or' tags, all of which must be satisfied for the 'and' to be satisfied. An 'or' tag can contain one or more 'constraint', 'not', 'and' and 'or' tags, any of which must be satisfied for the 'or' to be satisfied.

A 'modify-resource' tag at line 314 signals a resource whose source property may be modified. In a TVScript-BIF application, resources are referenced through unique identifiers, each identifier being associated with a URI that defines the source file from which the resource is generated. A 'modify-resource' tag has attribute 'file' that names the source file containing the declaration of the resource identifier, and attribute 'resource' that names the resource identifier whose source property is to be modified. A resource may be a constituent of a data resource.

The 'modify-resource' tag at line 314 contains two child 'constraint' tags at lines 315 and 316. These 'constraint' tags contain 'valid-extension' attributes that define allowable file extensions for a URI that is specified as the new source for the resource named in the 'modify-resource' tag.

A 'modify-cell' tag at line 318 denotes a cell within a data table, that is, a given row and column location within the data table, the value of which may be modified. A 'modify-cell' tag has attribute 'file' that names the source file containing the code for the data table, attribute 'table' that names the data table within the source file, attribute 'row' that signals the row within the table containing the cell, attribute 'col' that signals the column within the table containing the cell, and attribute 'type' that signals the type of the content to be supplied as the value for the data table cell. A data table may be a constituent of a data resource.

The 'modify-cell' tag at line 318 contains a 'constraint' tag at line 319 that specifies a range of valid values that can be substituted for the initial value of the cell at row 2, column 3 of data table 'tb11' in file 'data1.tvd'. The 'constraint' tag at line 319 specifies only a minimum value for the range. This signals that the range of valid values is any value greater than or equal to the minimum value, which in the example is zero.

The specific tags depicted in FIG. 3 are intended to be a representative but not limiting example of the types of modifications and constraints that might be specified in template application metadata. For example, a 'constraint' tag that specified only a 'range-max' attribute would define a range that extended to any value less than or equal to the maximum value. For real values, ranges might be defined inclusive or exclusive of the end points. For string values, a constraint might list a regular expression that the replacement value must match. Other types of allowable modifications and allowable constraints evident to one skilled in the art fall within the spirit and scope of the inventive system.

Figure 4:
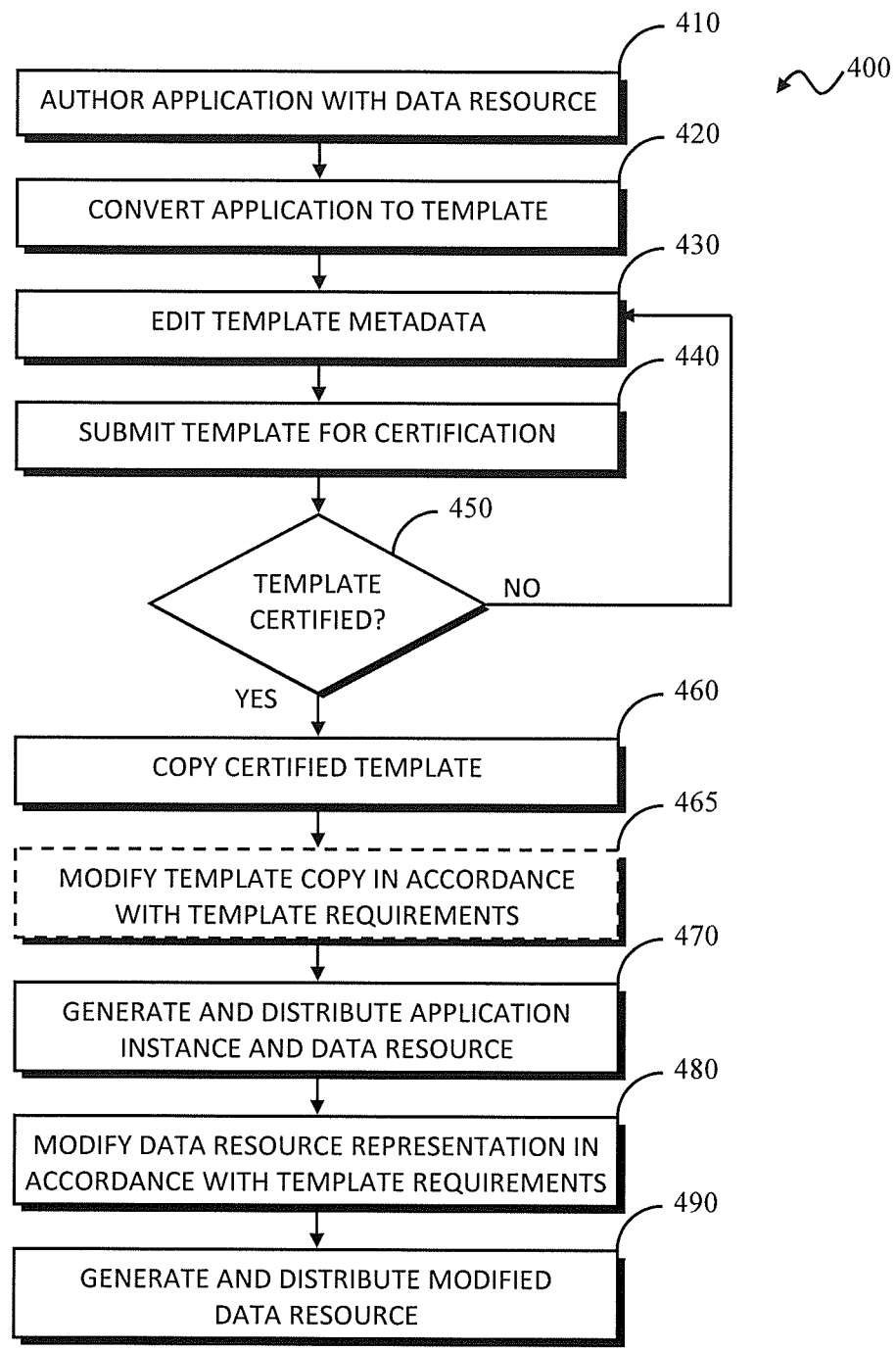
FIG. 4 depicts a flowchart delineating the high-level steps of an exemplary implementation of an aspect of the inventive method.

The presence of metadata stipulating allowable modifications and associated constraints on those modifications characterizes a master application template. Therefore, the process of authoring a template consists of creating the metadata defining the set of modifications and associated constraints that are allowable when modifying the original application representation and any associated data resource representations to create a new application based on the template. Attention is now directed to FIG. 4, which depicts a flowchart of the steps of creating and utilizing a master application template in accordance with the inventive method.

FIG. 4 depicts a flowchart 400 of the steps of an exemplary implementation of an aspect of the inventive method.

At a step 410, an application is authored. This step may be undertaken using any application authoring environment known in the art, the result being an application representation that defines the application appearance and behavior.

At a further step 420, the application is converted into a master application template by the addition of metadata to the application and data resource representations. In the exemplary implementation described above with reference to FIG. 3, the application and data resource representations comprise one or more source code files in human-readable format, while the metadata is stored in a separate XML document. In an alternative implementation, the application representation may be generated by creating an in-memory representation of the application structure and function, for example in the form of an object or a set of objects that correspond to the objects, properties, functions, and other elements of the executable application. This in-memory representation could be created by parsing source code, or by decompiling the contents of an executable application. Similarly, in this alternative embodiment a data resource representation may be generated by creating an in-memory representation of the structure and content of the resources comprising the data resource, for example in the form of an object or a set of objects that correspond to the contents of the resources. This in-memory representation could be created by parsing source code, or by decoding the contents of one or more resources. In this alternative embodiment, the metadata could be stored in an XML document associated with the original source code or the executable application and data resources, or the application and data resource representations could be serialized out to one or more disk files and the metadata stored in an XML document associated with the serialized application and data resource representations. In yet a further alternative embodiment, the application and data resource representations could comprise a series of objects that correspond to the elements of the executable application and data resources, and the objects could be stored in a relational database. In this yet further alternative embodiment, the metadata could be stored in the relational database in association with the objects comprising the application and data resource representations. Other forms of representation and storage might be employed without departing from the scope and intent of the inventive method.

At a further step 430, the master application template metadata are edited. The editing process comprises the creation, modification, rearrangement, and deletion of specifications of allowable modifications to the application representation, as exemplified by the modifications described above in reference to FIG. 3. The editing process further includes the creation, modification, and deletion of constraints on the allowable modifications, as exemplified by the constraints described above in reference to FIG. 3. The editing process may be performed through a text editor, through an application interface specifically encoded to allow such editing, or by other means known in the art.

At a further step 440, the master application template is submitted for certification. In accordance with the description above in reference to FIG. 1, the submission of an exemplary application generated from the template, along with the metadata comprising the allowable modifications to the application representation, is made to a certification body. The certification process is described in greater detail below with reference to FIG. 5.

At a further step 450, the certification body returns a certification decision. If the master application template is not certified, further editing is performed at a step 430, after which the master application template is again submitted for certification at a step 440. If the master application template is certified, the certified master application template is available for use in creating a certified application.

At a further step 460, a copy of the certified master application template is made, and an application representation is formed therefrom, for use in creating a new application instance with associated data resources.

At a further optional step 465, the application representation of the copy of the certified master application template may be modified in accordance with the metadata contained in the master application template. Only those aspects of the application representation specified in the metadata may be modified, and each such modification must be made in accordance with any constraints specified for the modification in the metadata.

Once all desired modifications have been performed at optional step 465, at a further step 470 the modified application representation is used to generate an application instance. By virtue of the inventive method, the resulting application can be denoted as certified without further analysis or testing by the certification body. The generated application instance is distributed for execution.

The operation performed at optional step 465 of modifying the application representation in accordance with the metadata contained in the master application template may be performed using any suitable editing environment known in the prior art. For example, U.S. Pat. No. 6,590,589 describes one such system that would be adaptable to the performance of source code modification. Similarly, the on-Q Publish™ software product marketed by Ensequence, Inc., provides a suitable editing environment for this purpose.

After the generation of the application, preferentially during the distribution and execution of the application instance, at a further step 480 the data representation of the copy of the certified master application template is modified in accordance with the metadata contained in the master application template. Only those aspects of the data resource representation specified in the metadata may be modified, and each such modification must be made in accordance with any constraints specified for the modification in the metadata.

Once all desired modifications have been performed, at a further step 490 the modified data resource representation is used to generate an updated data resource. By virtue of the inventive method, the resulting application can be modified as certified without further analysis or testing by the certification body. The modified data resource is distributed for execution.

The actions performed at steps 480 and 490 may be repeated as required zero or more times.

Figure 5:
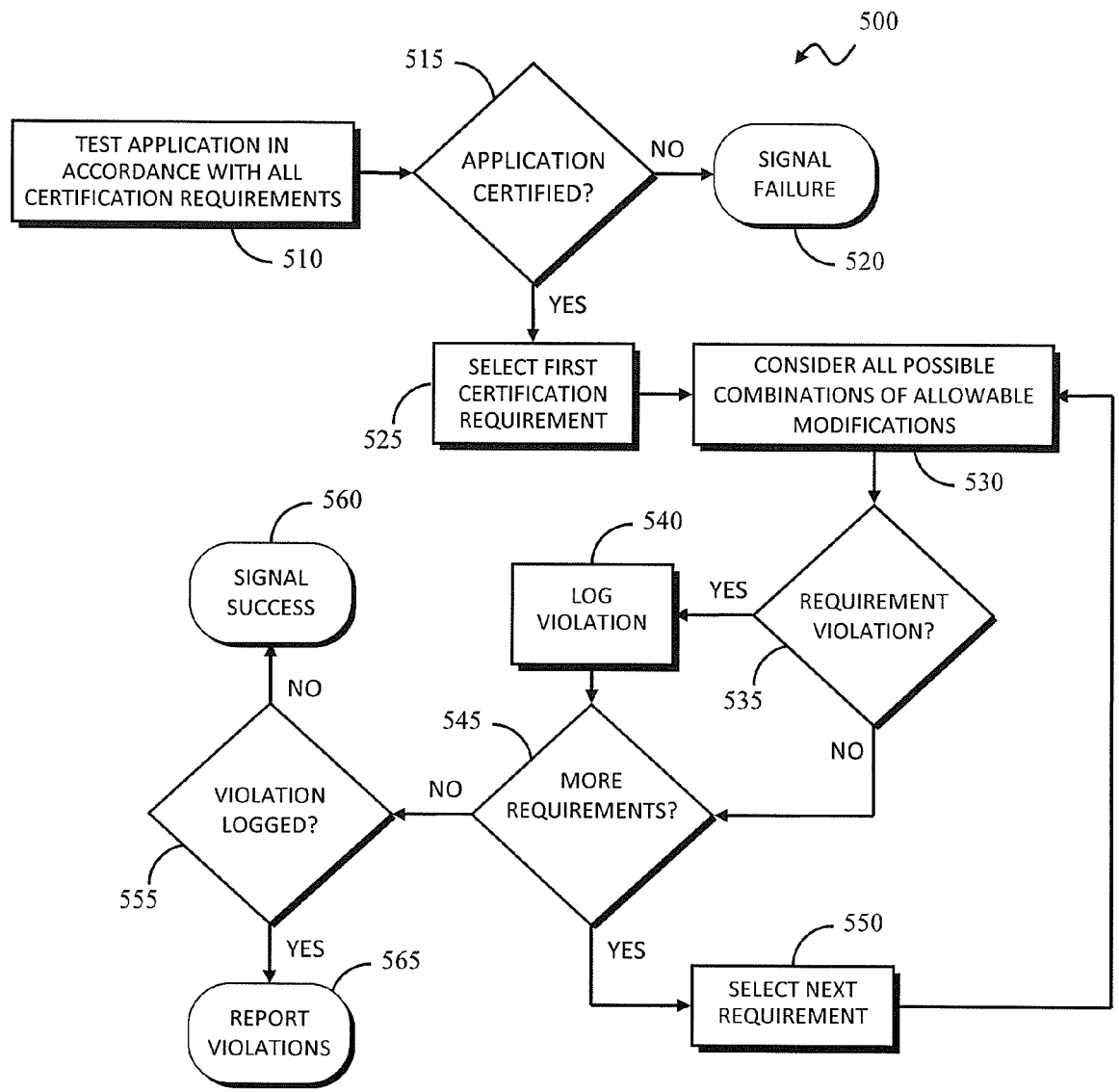
FIG. 5 depicts a flowchart delineating the high-level steps of an exemplary certification procedure.

Attention is now directed to FIG. 5, which depicts a flowchart of an exemplary process for certifying a master application template. At a step 510, the application submitted with the master application template is certified according to the conventional certification process for an application. At a step 515, the status of the application certification is determined. If the application failed certification, at a step 520 the certification failure is reported and the process terminates. If the application passed certification, at a step 525 the first certification requirement is selected. At a step 530, the appearance and behavior of the application for all allowable values of all allowable modifications are compared against the selected certification requirement. At a step 535, a determination is made if any of the allowable combinations of modifications violates the selected certification requirement. If the certification requirement is violated, at a step 540 the violation is logged. At a step 545, a check is made if at least one more certification requirement remains to be considered. If at least one certification requirement remains to be considered, at a step 550 a next certification requirement is selected, and step 530 is repeated. If no more certification requirements remain to be considered, at a step 555 a test is made if any certification requirement violation was logged. If no violation was logged, at a step 560 certification success is reported and the process terminates. If at least one violation was logged, at a step 565 all logged certification requirement violations are reported and the process terminates.

The term "computer" is used herein to refer to any device with processing capability such that it can execute instructions. Those skilled in the art will realize that such processing capabilities are incorporated into many different devices and therefore the term "computer" includes PCs, servers, mobile telephone, personal digital assistants and many other devices.

The methods described herein may be performed by software in machine readable form on a storage medium. The software can be suitable for execution on a parallel processor or a serial processor such that the method steps may be carried out in any suitable order, or simultaneously.

The description acknowledges that software can be a valuable, separately tradable commodity. The description is intended to encompass software, which runs on or controls 'dumb' or standard hardware, to carry out the desired functions. It is also intended to encompass software which 'describes' or defines the configuration of hardware, such as HDL (hardware description language) software, as is used for designing silicon chips, or for configuring universal programmable chips, to carry out desired functions.

The steps of the methods described herein may be carried out in any suitable order, or simultaneously where appropriate. Aspects of any of the examples described above may be combined with aspects of any of the other examples described to form further examples without losing the effect sought.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. In a computer system providing an application authoring environment, a method of deploying a certified application characterized by:
   generating a certified executable application with at least one data resource from a certified master application template, the data resource having a modifiable attribute associated with a constraint for modification, said generating step being characterized by:
      creating a representation of said certified executable application and a representation of said at least one data resource;
      selecting at least one attribute of the at least one data resource representation that is suitable for modification;
      specifying at least one requirement for modification of said selected attribute;
      creating at least one metadata item describing said at least one attribute and said at least one requirement;
      aggregating each of said at least one metadata item;
      associating said aggregated metadata with said at least one data resource representation;
      storing said metadata with said application representation and said at least one data resource representation;
      generating a first executable application and at least one first data resource from said application representation;
      determining that said first executable application and said at least one first data resource meet all requirements for certification; and
      determining that modifying each of said at least one attribute specified in said metadata in accordance with the constraint for the modification of said attribute does not violate any requirement for certification;
   distributing said certified executable application with said at least one data resource; and
   during the distribution of said certified executable application:
      modifying said certified master application template by modifying the attribute in accordance with the constraint for the modification of said attribute; and
      generating a modified data resource from said modified application template; and
      distributing said modified data resource.

2. The method of claim 1, wherein said data resource representation comprises at least one source code file.

3. The method of claim 1, wherein said data resource representation comprises an in-memory representation of said data resource.

4. The method of claim 1, wherein said data resource representation comprises an object representation of said data resource stored in a database.

5. The method of claim 1, wherein said attribute to be modified is the data content of a cell in a data table.

6. The method of claim 1, wherein said attribute to be modified is the data content of a resource.

7. The method of claim 1, wherein the constraint for a modification is that the modified value is one of a list of valid values.

8. A system for deploying a certified application, the system comprising:
   an application authoring component configured to allow creation of application source code;
   a template authoring component configured to create and modify, from the application source code, metadata associated with a master application template and interact with a certification authority to create a certified master application template having a certified data resource, said template authorizing component configured to:
      create a representation of said application source code;
      select at least one attribute of the application representation that is suitable for modification;
      specify at least one requirement for modification of said selected attribute;
      create at least one metadata item describing said at least one attribute and said at least one requirement;
      aggregate each of said at least one metadata item;
      associate said aggregated metadata with said application representation;
      store said metadata with said application representation;
      generate a first executable application for a target platform from said application representation;
      determine that said first executable application meets all of a set of requirements for certification on said target platform; and
      determine that modifying each of said at least one attribute specified in said metadata in accordance with all requirements for the modification of said attribute does not violate any of the set of requirements for certification on said target platform; and
   an application creation component configured to receive a copy of the certified application template from the template authoring component and create a certified application instance; and
   a resource creation component configured to create, from a copy of the certified master application template, a certified data resource.

9. The system of claim 8, wherein the application creation component is further configured to modify source files of the copy of the certified application within constraints embodied in the master application template metadata.

10. The system of claim 8, further including a template repository.

11. The system of claim 8, further including a distribution subsystem coupled to a distribution network and receivers for receiving and executing the certified application.

12. The system of claim 8, further including data resources coupled to provide input to the resource creation component, the resource creation component operating to modify a data resource representation within the copy of the certified application template.

* * * * *